A. PALMROS.
TROLLEY SWITCH.
APPLICATION FILED JAN. 12, 1901.
908,031.
Patented Dec. 29, 1908.
2 SHEETS—SHEET 1.
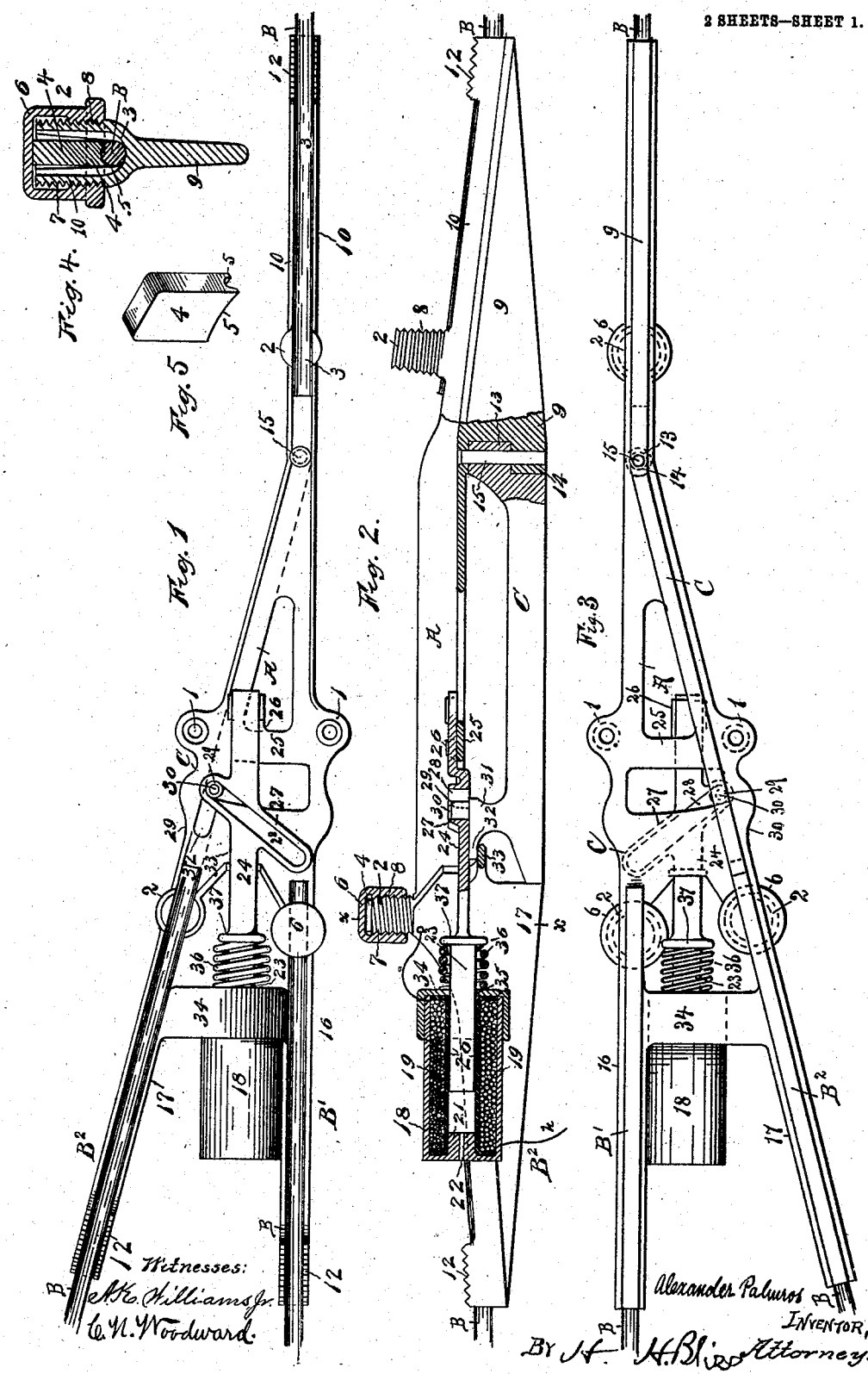

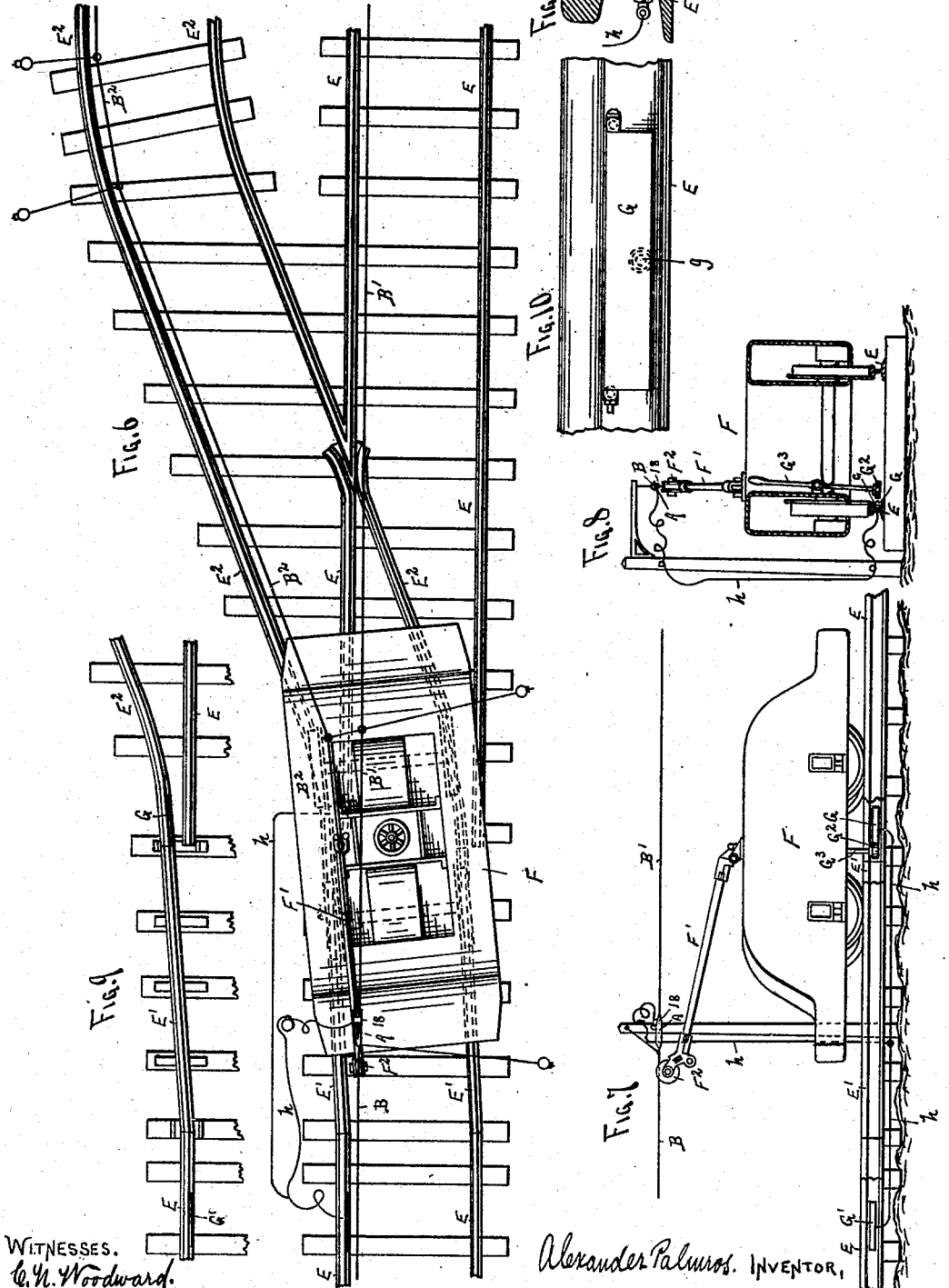

UNITED STATES PATENT OFFICE.

ALEXANDER PALMROS, OF FAIRMONT, WEST VIRGINIA, ASSIGNOR TO THE JEFFREY MANUFACTURING COMPANY, OF COLUMBUS, OHIO, A CORPORATION OF OHIO.

TROLLEY-SWITCH.

No. 908,031.   Specification of Letters Patent.   Patented Dec. 29, 1908.

Application filed January 12, 1901. Serial No. 43,033.

*To all whom it may concern:*

Be it known that I, ALEXANDER PALMROS, citizen of Finland, residing at Fairmont, in the county of Marion and State of West Virginia, have invented certain new and useful Improvements in Trolley-Switches, of which the following is a specification, reference being had therein to the accompanying drawing.

Figure 1 is a top plan view of a trolley switch embodying my improvements. Fig. 2 is a longitudinal sectional view of the same. Fig. 3 is a bottom plan view. Fig. 4 is a cross section on the line $x$, $x$ of Fig. 2, enlarged. Fig. 5 is a detached perspective view, enlarged, of the grip plug of the trolley wire clamp. Figs. 6, 7, 8 and 9 represent diagrammatic views of a section of an electric railway track and an electric locomotive illustrating the manner of making the electric connections. Figs. 10 and 11 are enlarged details of the rail contact mechanism.

Referring to the drawings, A indicates a frame, preferably triangular in form, and having any suitable means, such as ears 1, whereby it may be supported or suspended, to form a portion of a trolley line or conductor for the transmission of electrical power.

B, is the main trolley wire or conductor, securely attached to the narrower end of the frame A. For certain purposes of my invention this connection may be of any usual character, but I have devised the following means as best adapted for the firm but detachable securing of the conductor, and for the accurate and convenient switching of the trolley: 2 is a boss or stem divided or otherwise formed to provide within it a seat 3 for the conductor B. In this seat or space is fitted a plunger or plug 4, held from turning by the sides of said seat, and adapted at its inner end to firmly engage or "bite" the conductor, as by means of points or edges 5. The outer end of the plug extends beyond the boss 2, and movement and pressure of the plug towards and upon the conductor is given by a cap 6 fitting over the boss and engaging and pressing upon the outer end of the plug. Suitable means for forcing the cap towards the plug are provided, such for instance as male and female screw threads 7 and 8 on the boss and cap respectively. The boss 2 is cast with or firmly attached to the frame A, and the latter is provided with an arm or track rail 9, preferably cast with the frame A, which extends in the direction of the conductor B, and has at its outer end flanges 10 between which is formed a seat 3' for the conductor. Said flanges may be adapted to positively engage the conductor, as by being provided with ridges or points 12, and by being made malleable so that they may be bent down into firm engagement with the conductor. The rail 9 extends inward and downward towards the lower part of the frame A, forming a guiding device for the trolley from and to the conductor B, and terminates at its inner lower end at or near the pivoted end of the switch blade C. The heel of said blade is formed with a bearing 13 which extends between a portion of the frame A and the inner extremity 14 of the rail 9, whereby the latter supports said blade, and the latter is pivotally mounted by means of a bolt or rivet 15 which passes through said bearing and is secured in the frame A and part 14.

B' is the continuation of the main conductor situated in line with the part B, attached at the other end of the frame A by a boss, plug, and screw cap, as already described in connection with the conductor B, and having a rail or trolley guiding device 16 similar to that described at 9 and adapted to direct the trolley to or receive it from the movable end of the switch blade C when the latter is in proper position.

$B^2$ is the branch conductor attached to the frame A in the manner already described in connection with the conductors B, B', but extending at an angle to the line of the main conductor. Consequently its trolley guiding rail 17, otherwise similar to the rails 9 and 16, extends at an angle to the latter, substantially in line with the pivot 15, and is adapted to direct the trolley to or receive it from the switch plate C when the latter has been set in line with the conductors B, and $B^2$. For this purpose the switch blade may be set or adjusted in line either with the rail 16 and conductor B', or with the rail 17 and conductor $B^2$, by various means or mechanisms.

One form of my invention comprises an electro-magnetic device and a spring, the switch blade being normally kept in the main line by the action of the spring, and being switched to the branch line when desired by the operation of said electro-magnetic device.

Referring to the drawings, 18 indicates a metallic casing or jacket (which however may be of other suitable material) suitably mounted in or on the frame A, preferably in line with the median position of the switch blade between the rails 16 and 17. Said jacket contains a solenoid coil 19 around a suitable tube or support 20 of insulating material, and at its outer end is formed with an inwardly extending boss 21 which centers said support and coil and has an air opening 22.

23 is a solenoid core or plunger adapted to reciprocate within the tube 20, and carrying at its outer end an arm or extension 24. The latter is supported by a transverse bar 25 of the frame A, and is guided by lugs 26 on said bar. The arm 24 is formed with a diagonally transverse yoke 27, having a slot or recess 28. In the latter is fitted an anti-friction roller 29 journaled on a pin 30 carried by a bracket 31 on the switch blade C. Said bracket is also formed with a finger or projection 32 which extends above and rests upon a transverse bar 33 of the frame A which allows the oscillation of the switch blade but maintains the latter vertically in the planes of the rails 16 and 17.

34 is a transverse bar or web of the frame A situated at the inner end of the jacket 18, and formed with an opening 35 through which the plunger 23 may enter the coil 19.

36 is a compression spring acting to force the plunger out of the coil and to set or hold the switch blade in the position to connect the two portions B and B' of the main conductor, by reason of the action of the inclined yoke 27 on the roller of the switch blade. This spring is conveniently mounted on the plunger 23, bearing at one end against the bar 34 and at its other end against a collar 37 on said plunger. When it is desired to set the switch blade in line with the rail 17 and conductor B², the coil 19 is energized by an electrical current from any suitable source, for instance from the main trolley line, whereupon the plunger 23 is drawn within the coil, overcoming the resistance of the spring 36, the roller 29 is caused to travel to the other end of the slot 28 and the switch blade C is carried into line with the rail 17 and conductor B², as represented in Figs. 1 and 3 and there held until the trolley has been switched as desired, whereupon the coil may be deënergized and the spring 36 allowed to restore the switch blade to its normal position in the main line.

The frame A is constructed right or left according to the side on which the branch line is situated.

Any suitable means may be employed for energizing the magnet 19 from the locomotive, and in Figs. 6 to 11 such a means is shown, consisting in contact plates adjacent to the track and in electrical connection with the magnet 19, and with means on the locomotive whereby circuits may be closed or opened with such contact plates at the proper points, to throw the guide rail C over to the branch B².

In the drawings E represents the main track rails, E' the switch rails, E² the branch line rails, and F an electric locomotive of the form usually employed in mining operations, where the device sought to be protected is especially valuable.

F' represents the trolley pole and F² the trolley wheel.

G, G' represent contact plates attached at any convenient point adjacent to the track, as for instance to the inside of the rails, as shown, and G² represents a contact closer upon the locomotive and adapted to be brought into engagement with the contact plates G or G' at the will of the motorman.

The contact closer G² is shown in the form of a roller upon the lower end of a pivoted lever G³, and the contact plates G, G' are hinged by their upper edges and held normally out of contact with the head of a bolt $g$ as by a spring $g'$. The bolts $g$ are insulated from the rails and the plates G, G' connected to the rails or grounded. The bolt $g$ is in electrical circuit, as by wire $h$, with the coil 19 of the electro-magnet.

What I claim is:—

1. In a trolley switch the combination of the main conductor, a branch conductor, a movable tongue or blade adapted to direct the trolley from one conductor to another, a yoke or cam movable in the direction of one of said conductors and connected with the said blade by a cam engaging element carried thereby and adapted to shift it towards and from a conductor, and means for actuating said yoke or cam, substantially as set forth.

2. In a trolley switch the combination of the main conductor, a branch conductor, a movable tongue or blade adapted to direct the trolley from one conductor to another, a yoke or cam movable in the direction of one of said conductors and connected with the said blade by a cam engaging member carried thereby and adapted to shift it towards and from a conductor, and an electro-magnetic device for actuating said yoke or cam, substantially as set forth.

3. In a trolley switch the combination of the main conductor, a branch conductor, a movable tongue or blade adapted to direct the trolley from one conductor to another, a bar having an inclined slot or bearing surface and movable longitudinally of said blade, means whereby the blade engages said slot or bearing surface, and means for actuating said bar.

4. In a trolley switch the combination of the main conductor, a branch conductor, a movable tongue or blade adapted to direct the trolley from one conductor to another, an electro-magnetic device situated between said main and branch conductor one part of which device is movable longitudinally and a connection between said part and said blade adapted to be moved bodily by said longitudinally movable part to shift the blade relative to said conductor.

5. In a trolley switch the combination of the main conductor, a branch conductor, a movable tongue or blade adapted to direct the trolley from one conductor to another, an electro-magnetic device comprising a solenoid coil and core situated between said main and branch conductors, and a slidable connection between said core and blade adapted to shift the same relative to a conductor.

6. In a trolley switch the combination of a frame adapted for the attachment of a main and branch conductor, a switch blade or tongue pivotally mounted on said frame, a transverse guide supporting the free end of said blade and permitting its oscillation, and means for actuating said blade, said actuating means comprising a bar movable longitudinally of said blade.

7. In a trolley switch the combination of a frame adapted for the attachment of a main and branch conductor, a switch blade or tongue pivotally mounted on said frame, and an actuating device mounted on said frame and comprising a bar movable longitudinally of the blade and engaging the latter between its pivotal connection and its free end to shift the same.

8. In a trolley switch the combination of a frame adapted for the attachment of the main and branch conductors, a switch blade or tongue pivotally mounted on said frame, a bar movable longitudinally of said blade and connected with the same between its pivotal connection and its free end, and an electro-magnetic device for operating said bar.

9. In a trolley switch the combination of the frame, a switch blade or tongue pivotally mounted thereon, an electro-magnetic device mounted on said frame beyond the free end of said blade, and a direct slidable connection between said device and said blade adapted to control the movements of the latter, substantially as set forth.

10. In a trolley switch the combination of the frame, a switch blade pivotally mounted thereon, a roller mounted on said blade, a yoke or cam mounted on said frame adapted to slide relative to said blade and having a bearing surface engaging said roller, and means for actuating said yoke.

11. The combination of the frame having the two arms for attaching the main conductor and a diverging arm for a branch conductor all formed integral, the movable tongue or switch blade, pivotally mounted on said frame said blade and arms having downwardly projecting vertically arranged trolley-engaging plates, an electro-magnet mounted on said frame with its axial lines arranged longitudinally of the frame, and with its armature adjacent to the free end of the switch blade, and means connecting the armature to the switch blade near the free end of the latter, substantially as set forth.

12. In an electric railway trolley switch, the railway track, the main conductor, a branch conductor, a movable tongue or switch adapted to conduct the trolley from one conductor to another, an electro-magnet connected to actuate said tongue, one or more contacts adjacent to said track and in electrical connection with said electromagnet, and means under the control of the operator on the locomotive upon said track whereby said contact may be connected into an electric circuit and said magnet thereby energized to actuate said tongue, substantially as set forth.

In testimony whereof I affix my signature in presence of two witnesses.

ALEXANDER PALMROS.

Witnesses:
J. H. WHEELWRIGHT.
C. F. WEEKLEY.